US012627228B2

(12) United States Patent
Meillereux et al.

(10) Patent No.: US 12,627,228 B2
(45) Date of Patent: May 12, 2026

(54) CHARGE PUMP REGULATOR

(71) Applicant: STMicroelectronics International N.V., Geneva (CH)

(72) Inventors: Alexandre Meillereux, Sassenage (FR); Bruno Gailhard, Peypin (FR); Luc Garcia, Saint Paul de Varces (FR)

(73) Assignee: STMicroelectronics International N.V., Geneva (CH)

( * ) Notice: Subject to any disclaimer, the term of this patent is extended or adjusted under 35 U.S.C. 154(b) by 47 days.

(21) Appl. No.: 18/606,907

(22) Filed: Mar. 15, 2024

(65) Prior Publication Data

US 2024/0333145 A1     Oct. 3, 2024

(30) Foreign Application Priority Data

Mar. 31, 2023    (FR) ...................................... 2303144

(51) Int. Cl.
*H02M 3/07*          (2006.01)
*G05F 1/575*         (2006.01)

(52) U.S. Cl.
CPC .............. *H02M 3/07* (2013.01); *G05F 1/575* (2013.01)

(58) Field of Classification Search
None
See application file for complete search history.

(56) References Cited

U.S. PATENT DOCUMENTS

| | | | | | |
|---|---|---|---|---|---|
| 4,539,551 | A | * | 9/1985 | Fujita | H03K 5/249 341/158 |
| 5,359,244 | A | * | 10/1994 | Hopkins | H03K 17/04123 327/131 |
| 5,539,610 | A | * | 7/1996 | Williams | H02J 7/0034 307/130 |
| 5,672,992 | A | * | 9/1997 | Nadd | H03K 17/162 327/437 |
| 5,675,241 | A | * | 10/1997 | Teggatz | G05F 3/247 323/303 |
| 6,150,873 | A | * | 11/2000 | Sohn | G05F 1/465 327/540 |
| 6,388,506 | B1 | * | 5/2002 | Voo | H02M 3/073 327/536 |
| 6,404,290 | B1 | * | 6/2002 | Voo | H02M 3/07 331/8 |
| 6,556,069 | B1 | * | 4/2003 | Casier | H02M 3/07 327/540 |
| 6,566,846 | B1 | * | 5/2003 | Voo | H02M 3/07 323/267 |
| 6,690,227 | B2 | * | 2/2004 | Lee | H02M 3/073 327/536 |
| 8,766,709 | B2 | * | 7/2014 | Kim | G11C 5/147 327/143 |
| 9,778,672 | B1 | * | 10/2017 | Gao | G05F 1/575 |

(Continued)

*Primary Examiner* — Thomas J. Hiltunen
(74) *Attorney, Agent, or Firm* — Seed Intellectual Property Law Group LLP

(57) ABSTRACT

The present disclosure relates to a regulator including a first transistor coupling an application node of a first power supply voltage to an output node of the regulator supplying a first regulated voltage; a feedback loop supplying a control signal to the first transistor and comprising a first charge pump circuit; a control signal generator of the first charge pump circuit; and a drop-down circuit between the control signal generator and the charge pump circuit.

20 Claims, 14 Drawing Sheets

(56) References Cited

U.S. PATENT DOCUMENTS

| | | | | |
|---|---|---|---|---|
| 10,404,164 | B1 * | 9/2019 | Stevenson | ............ H03K 17/063 |
| 11,368,149 | B2 * | 6/2022 | Niikura | ................... H02M 1/08 |
| 12,276,993 | B2 * | 4/2025 | Pande | .................... H02M 3/07 |
| 2011/0156670 | A1 | 6/2011 | Tadeparthy et al. | |
| 2013/0176006 | A1 | 7/2013 | van Ettinger et al. | |
| 2024/0348143 | A1 * | 10/2024 | Das | ........................ H02M 3/07 |

* cited by examiner

V11CK, V11CK2, V11

2F11

702

NM1

704

V11CK, V11, V11CK2

716

NM2

714

CHARGE PUMP REGULATOR

CROSS REFERENCE TO RELATED APPLICATION(S)

This application claims the priority benefit of French patent application number FR2303144, filed on Mar. 31, 2023, entitled "Régulateur à pompe de charge", which is hereby incorporated by reference to the maximum extent allowable by law.

BACKGROUND

Technical Field

The present disclosure relates generally to charge pump regulators and integrated circuits containing such regulators.

Description of the Related Art

Charge pump regulators, in particular low power regulators, are used to supply charges whose consumption can vary for example from around a hundred nanoamperes to several tens of milliamperes.

In low consumption applications, the preferred regulators are either SMPS (Switched mode power supply) which, however, utilize extra external connections and components, or charge pump regulators to limit the quiescent current (the consumption) of their servo loop.

BRIEF SUMMARY

There is a desire for improvement in charge regulators, and integrated circuits containing these regulators.

One embodiment addresses some or all of the drawbacks of known systems.

One embodiment provides a regulator comprising:
a first transistor connecting an application node of a first supply voltage to an output node of the regulator supplying a first regulated voltage;
a feedback loop supplying a control signal to the first transistor and comprising:
a first charge pump circuit;
a control signal generator of the first charge pump circuit; and
a step-down circuit between the control signal generator and the charge pump circuit.

In one embodiment, the control signal generator comprises a clock signal generator coupling the output node and the step-down circuit.

In one embodiment, the step-down circuit comprises a supply node configured to receive a lower voltage than the first supply voltage.

In one embodiment, the step-down circuit comprises a buffer circuit configured to be controlled at its input by the clock signal.

In one embodiment, the said buffer circuit comprises a first inverter stage with a PMOS transistor in series with an NMOS transistor, with their respective control nodes configured to be controlled by the clock signal, a midpoint between the said PMOS transistor and the said NMOS transistor of the first stage being coupled to the charge pump circuit.

In one embodiment, the said buffer circuit comprises a second inverter stage with a PMOS transistor in series with an NMOS transistor, their respective control nodes being connected to the said midpoint of the first stage.

In one embodiment, a midpoint of the said PMOS transistor and the said NMOS transistor of the second stage is coupled to the charge pump circuit.

In one embodiment, a conduction node of the PMOS transistors of the first and/or second stages is coupled to the said supply node of the step-down circuit.

In one embodiment, the output node is coupled to the said supply node of the step-down circuit.

In one embodiment, the step-down circuit comprises a second and third transistor, each having a conduction node connected to the step-down circuit power supply node and another conduction node coupled to the application node of the first supply voltage.

In one embodiment, a control node of the second transistor is configured to receive the control signal of the first transistor.

In one embodiment, a control node of the third transistor is coupled to an application node with a lower reference voltage than the first supply voltage.

In one embodiment, the feedback loop comprises a comparator circuit configured to compare the first voltage with a first reference voltage;
the first charge pump circuit being enabled or disabled in accordance with the said comparison.

In one embodiment, the regulator contains a second charge pump circuit configured to supply a control signal to the first transistor when the first charge pump circuit is disabled.

In one embodiment, the regulator comprises:
a second comparator circuit configured to compare the first voltage with another reference voltage lower than the first reference voltage; and
a second control signal generator;
the second charge pump circuit being controlled by the second control signal generator in accordance with the comparison between the first voltage and the other reference voltage lower than the first reference voltage.

One embodiment provides an integrated circuit comprising a regulator as described above.

BRIEF DESCRIPTION OF THE SEVERAL VIEWS OF THE DRAWINGS

The foregoing features and advantages, as well as others, will be described in detail in the following description of specific embodiments given by way of illustration and not limitation with reference to the accompanying drawings, in which.

DETAILED DESCRIPTION

Like features have been designated by like references in the various figures. In particular, the structural and/or functional features that are common among the various embodiments may have the same references and may dispose identical structural, dimensional and material properties.

For the sake of clarity, the operations and elements that are useful for an understanding of the embodiments described herein have been illustrated and described in detail.

Unless indicated otherwise, when reference is made to two elements connected together, this signifies a direct connection without any intermediate elements other than conductors, and when reference is made to two elements coupled together, this signifies that these two elements can be connected or they can be coupled via one or more other elements.

In the following disclosure, unless specified otherwise, when reference is made to absolute positional qualifiers, such as the terms "front," "back," "top," "bottom," "left," "right," etc., or to relative positional qualifiers, such as the terms "above," "below," "higher," "lower," etc., or to qualifiers of orientation, such as "horizontal," "vertical," etc., reference is made to the orientation shown in the figures.

Unless specified otherwise, the expressions "around," "approximately," "substantially" and "in the order of" signify within 10%, and preferably within 5%.

Figure 1:
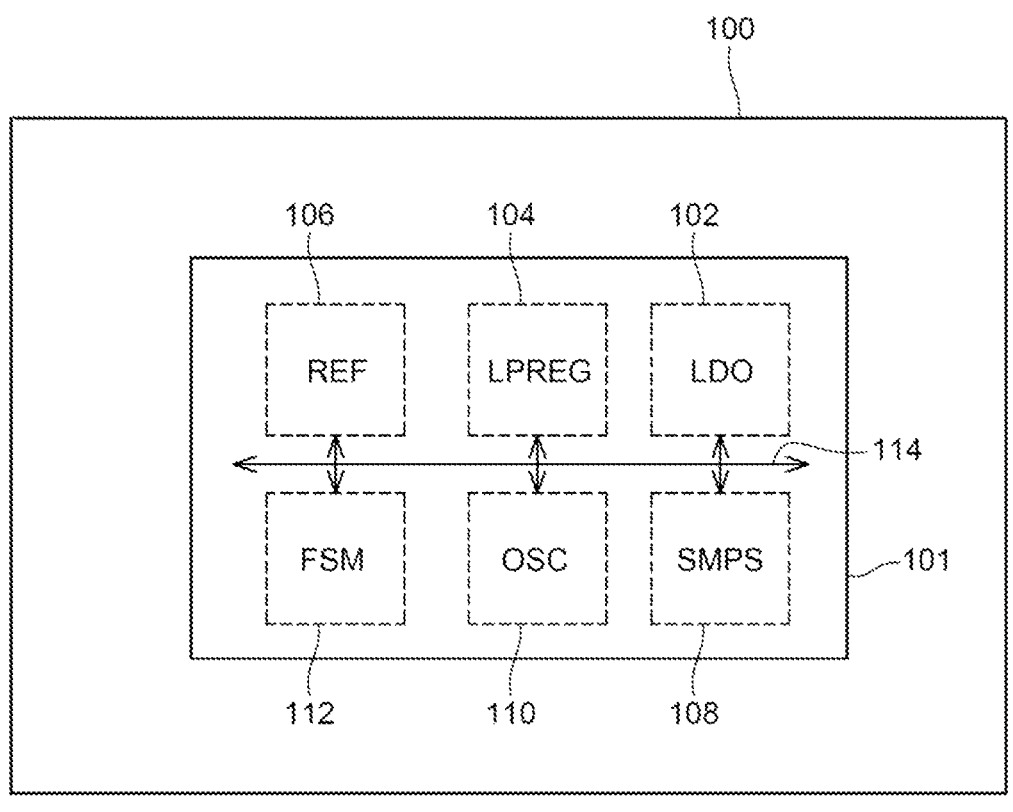
FIG. 1 shows highly schematically as a block diagram an example of an integrated circuit of the type to which the embodiments described apply.

FIG. 1 shows highly schematically as a block diagram an example of an integrated circuit 100 of the type to which the embodiments described apply.

The circuit 100 comprises for example a power supply unit 101 configured to supply the rest of the circuit 100 with various voltages and/or currents according to their specifications. The power supply unit 101 comprises for example a low-dropout regulator (LDO) 102, a low power regulator (LPREG) 104, a switched mode power supply (SMPS) 108, an oscillator (OSC) 110 generating a reference frequency, a finite state machine (FSM) 112 and a reference voltage supply module (REF) 106. The state machine 112 is configured to control the operating of the other blocks of the power supply unit 101. Module 106 (REF) supplies one or more reference voltages, for example from the forbidden band voltage between valence band and conduction band (voltage bandgap). Blocks 102, 104, 106, 108, 110 and 112 are for example coupled with each other and/or the rest of the integrated circuit 100 through a bus 114 carrying their respective signals.

The present disclosure relates more specifically to the regulator 104 which is dedicated to operating at lower consumption than the regulator 102.

A regulator, for example linear or by charge pump, is based on a transistor, typically a MOS power transistor, in series with the load between a power source (voltage source) and a reference potential, typically the mass. The MOS transistor is controlled in saturation mode, such that the gate to source voltage (Vgs) that is applied to it controls the current (drain-source Ids) passing through it. The maximum power of the regulator depends on the size of the transistor (or transistors associated in parallel).

In a regulator of the type of regulator 102, a servo loop of the output voltage to a reference value (i.e., maintaining an output voltage of the same value whatever the fluctuations in load current drawn) is based on a comparison of the output voltage and a reference value to continuously vary the gate voltage of the power transistor via an amplifier.

The embodiments described relate to another category of regulators (104, FIG. 1) whose servo loop, if it remains active and continuous, acts when the voltage drops below a preset threshold. Its quiescent current is therefore less than for a regulator, for example linear, with continuous closed-loop control (regulator with amplifier). These capacitive charge pump regulators are therefore especially suited to operation in periods of low consumption of the circuit containing them.

Figure 2:
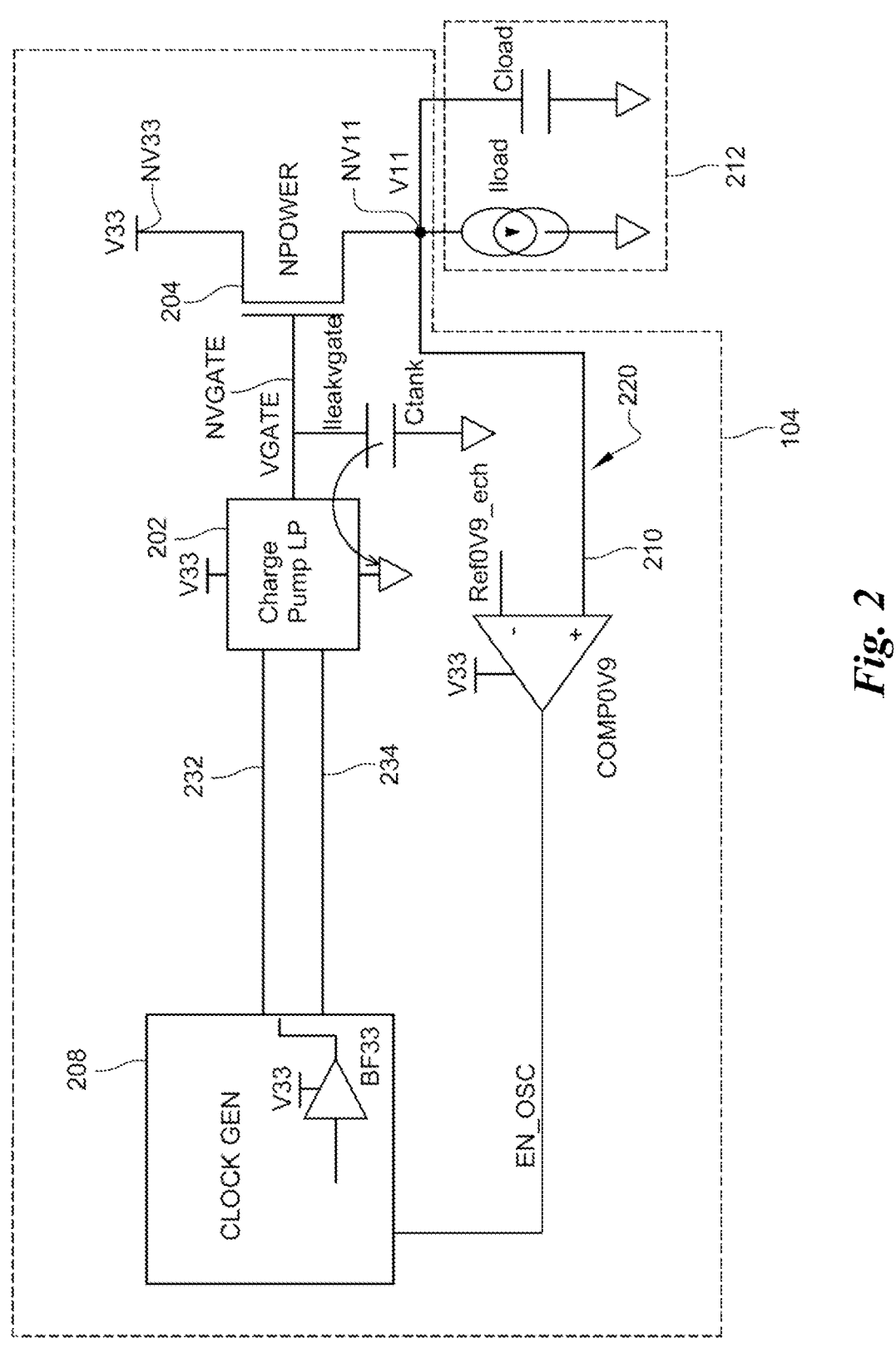
FIG. 2 shows schematically an example of a regulator.

FIG. 2 shows schematically an example of a charge pump regulator 104 of the type to which the embodiments described apply.

The regulator 104 is coupled, preferably connected, to a voltage source V33 and supplies an output node (NV11) with a regulated voltage (V11) and/or a regulated current (Iload) to a load 212 exterior to the regulator 104. In FIG. 2, the load 212 is represented by a current source (Iload) in parallel with a charge capacitor (Cload), both being referenced to the mass.

The regulator 104 comprises a first MOS transistor 204 (NPOWER) whose drain is coupled, preferably connected, to an application node (NV33) of a first supply voltage (V33) and whose source is coupled, preferably connected, to an output node NV11 of the regulator 104. The first transistor 204 is for example an NMOS transistor whose gate (NVGATE) is coupled, preferably connected, to an output of a servo loop controlling the gate voltage according to load specifications. The first MOS transistor 204 supplies the regulated voltage (V11) to the output node NV11. The regulated voltage (V11) is generated using the first supply voltage (V33).

In the embodiment described, the servo loop includes a charge pump LP circuit 202 referenced to the mass. The charge pump 202 circuit is typically a capacitive pump charge circuit with switched capacitors, and is configured to supply a control signal (VGATE) to the NVGATE gate of the first transistor 204.

A tank capacitor (Ctank) couples the NVGATE gate of the transistor to the mass to smooth the NVGATE control voltage supplied by the charge pump.

The use of a charge pump often involves having its control signal to be a switched signal. The servo loop therefore comprises an oscillator or clock signal generator 208 (ClockGen) to enable the charge pump to increase the VGATE voltage when current is drawn by the load 212 or more generally in order to compensate for internal leaks that make the VGATE fall by discharging in particular in retention modes (without dynamic activity).

In the servo or feedback loop 220, the regulator 104 shown furthermore comprises a voltage comparator 210 (COMP0V9) of the output node NV11 with a reference voltage Ref0V9_ech. The output of the comparator 210 is coupled to an enabling input EN_OSC of the clock signal generator 208. It is often desirable to have inverted signals to control the switches of a charge pump circuit 202. The clock signal generator 208 then supplies two signals respectively direct 232 and inverted 234 to the charge pump circuit. These signals are generated by an output buffer circuit BF33 of the generator 208, configured to send and invert the clock signal generated. If the voltage V11 is higher than the reference voltage Ref0V9_ech, then the comparator 210 changes the state of the signal EN_OSC, enabling the clock signal to be generated. The charge pump circuit is then enabled to raise the VGATE voltage level, hence the voltage V11 level.

The fact of enabling the generator 208 and the charge pump 202 when the comparator 210 detects a reduced requirement considerably reduces the quiescent current consumption of the regulator loop, essentially limiting the comparator consumption. The voltage Ref0V9_ech can be a fixed level but is, for example, sampled in order to reduce consumption still more.

However, the gate control signal VGATE is likely to show ripples related to a discharge of the tank capacitor Ctank under the effect of a parasitic leakage current (Ileakgate) to the charge pump circuit and also under the effect of the charge pump recharging the capacitor.

To enable the regulator to start when V33 switches on, the regulation loop is usually, as illustrated in FIG. 2, supplied by the voltage V33. This, the clock generator 208, the charge pump circuit 202 and the comparator 210 are supplied by the voltage V33.

Now, the ripples on the power transistor gate are the greater since the amplitude of the signals 232 and 234 is related to the supply voltage level given that the latter can vary considerably by more than a factor of two (for example between 1.58 V and 3.6 V). In other words, the ripples on the power transistor gate are the greater, the larger the gap between the high and low states of signals 232 and 234. The regulator should, however, continue to perform well over the range of possible values of supply voltage.

According to the embodiments described, it is provided to integrate in the charge pump regulator 104 a level shifter between the switching signal generator, or the clock signal generator 208, and the charge pump circuit 202. This enables charge pump circuit input signals to be obtained having a difference between the high and low levels lower than that of the signals obtained with the supply voltage V33 and with fewer variations than the supply voltage V33. The residual oscillations are thereby limited at the output of the charge pump circuit.

According to one embodiment, it is provided to use the regulator output voltage V11 to supply a buffer circuit for shaping the charge pump control signals. An advantage is then that, unlike the supply voltage V33 which can vary by several volts in the case of a battery supply, for example, the voltage V11 is regulated and therefore more stable. There should, however, always be a starting mode in the level shifter to enable operation and starting of the charge pump. However, the switching of transistor in the shaping buffer circuit can perturb the voltage V11 by drawing current.

According to another embodiment, it is provided to generate the level shifter amplifier voltage with a dedicated circuit, from the voltage V33. This enables the start function without perturbing the regulated voltage V11.

Figure 3:
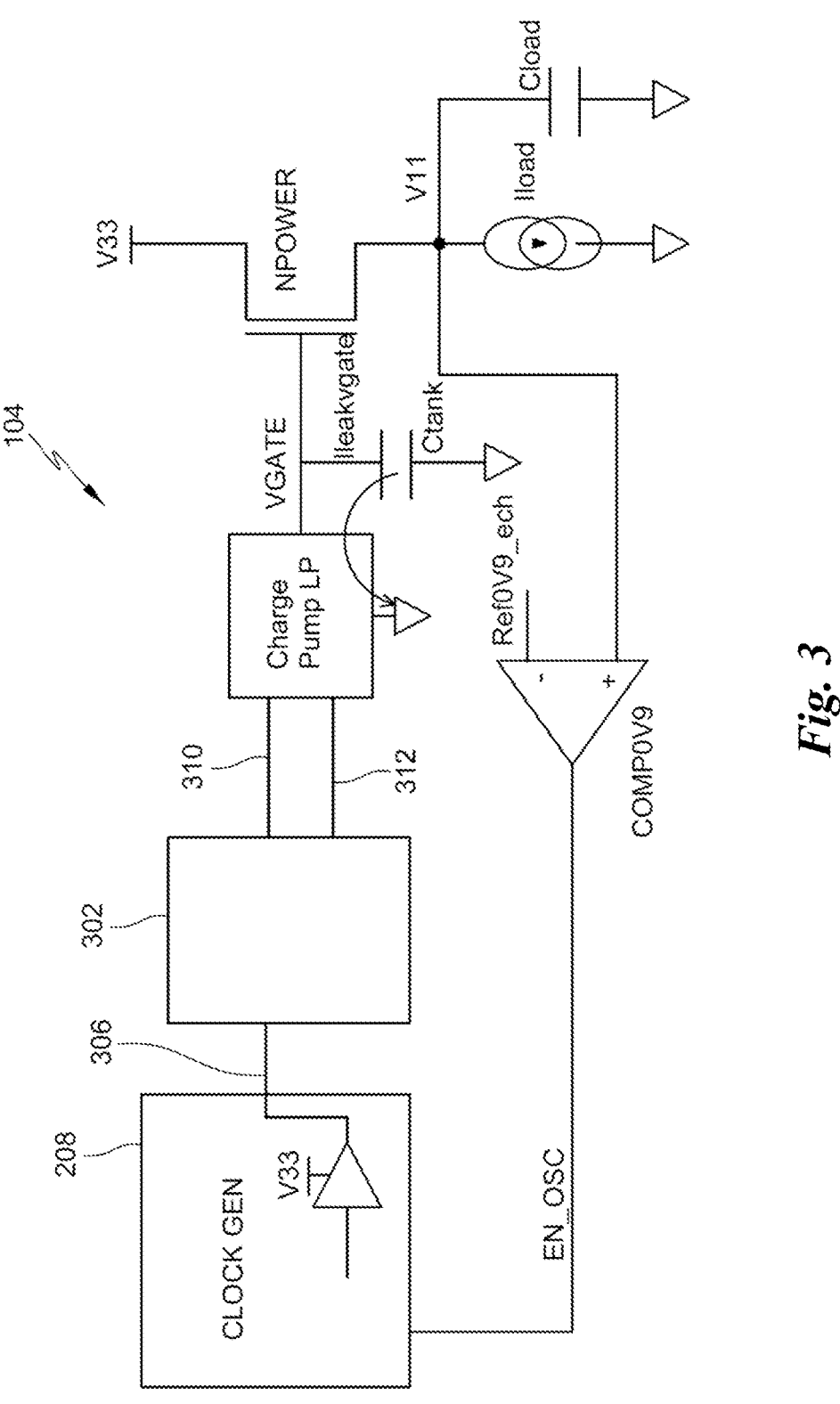
FIG. 3 shows schematically a regulator according to one embodiment.

FIG. 3 shows schematically a charge pump circuit 104 according to one embodiment.

The charge pump regulator 104 in FIG. 3 is similar to that in FIG. 2 except that the level shifter or step-down circuit 302 is added between the switching signal generator 208 and the charge pump circuit 202.

In the example shown, the clock signal generator 208 has a single output 306 and the level shifter circuit 302 comprises two outputs 310, 312 on which inverted signals are generated and sent to the charge pump 202 to control the charge pump 202. In another example, not illustrated, instead of two outputs, a single output is used. In yet another example, not illustrated, the clock signal generator 208 has two inverted outputs and the level shifter circuit 302 comprises two outputs.

The level shifter circuit 302 is configured to input the clock signal generated by the clock signal generator 208, hence with an amplitude that varies with the supply voltage V33, then, using the inputted clock signal, to output a clock signal that propagates with high and low levels separated by a lower amplitude than the supply voltage V33.

Figure 4:
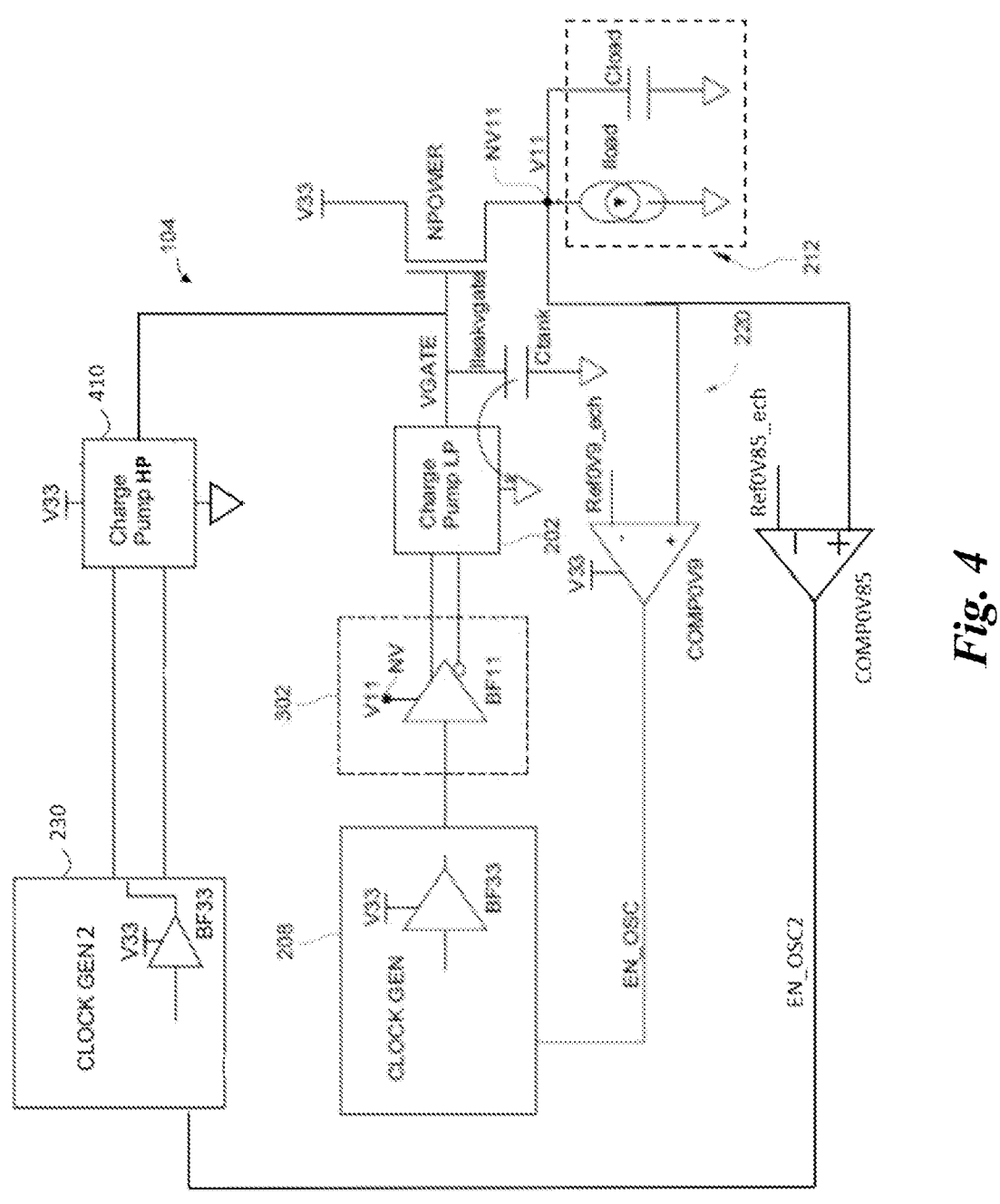
FIG. 4 shows schematically a regulator according to another embodiment.

FIG. 4 shows schematically the charge pump circuit 104 according to one embodiment.

More specifically, FIG. 4 illustrates one embodiment of the level shifter circuit 302 of FIG. 3. According to this embodiment, the circuit 302 comprises an amplifier or buffer circuit (BF11) with two inverted outputs, configured to be controlled at its input by a clock signal from the clock signal generator 208, and supplied by the output voltage V11 of the regulator, applied to a supply node NV of the circuit 302. The other terminal (not shown) of the buffer circuit BF11 supply is coupled, preferably connected to the mass.

The voltage V11 is already regulated by the action of the feedback loop 220, and this limits the residual oscillations at the output of the charge pump circuit without the need to generate the lower supply voltage for the circuit 302 separately.

To enable the regulation loop to be turned on, the regulator 104 comprises, according to this embodiment, a second charge pump 410 (charge pump HP) whose output is coupled, preferably connected, to the output of the charge pump circuit 202, in which the gate of the NPOWER transistor and the inputs are coupled, preferentially connected, to a second clock generator 230 (CLOCK GEN 2). This second charge pump circuit 410 is controlled for example directly by signals from the second generator 230, which is powered by voltage V33 to establish the voltage V11 and thus enabled to turn on the feedback loop including the circuit 302. A control circuit, not shown, turns off the charge pump circuit 410 when the voltage V11 is established and the circuit 202 then takes over. To do this, this control circuit comprises for example a voltage comparator V11 with the desired reference level (Ref0V85_ech). In the example shown, this comparator (COMP0V85) generates another signal EN_OS2 which is input to the second clock generator circuit. The second clock signal generator is thus controlled by the signal EN_OSC2 such that it can generate a frequency other than that of the clock signal generator 208.

This starter circuit 410 also enables inrush current demands to the load 212 to be responded to. In such a situation, the voltage V11 has a tendency to collapse. It is therefore provided that the control circuit (not shown) enables the charge pump 410 when it detects that the voltage V11 drops below the desired reference level Ref0V85_ech. This desired reference level is chosen to be lower than the threshold Ref0V9_ech so as to allow operation in conditions established with the charge pump 202.

Figure 5:
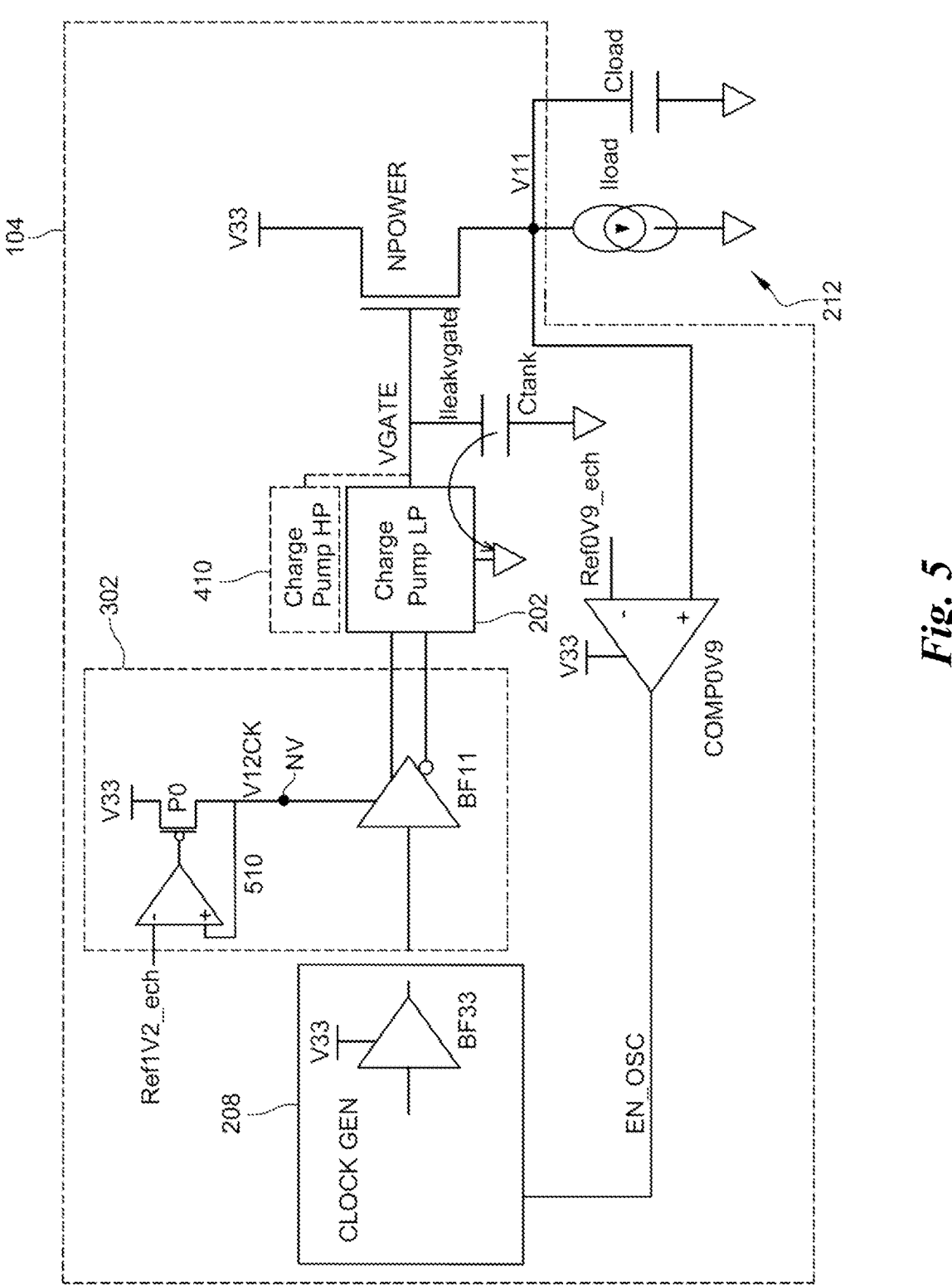
FIG. 5 shows schematically a regulator according to another embodiment.

FIG. 5 shows schematically a charge pump regulator according to yet another embodiment.

The regulator in the example of FIG. 5 is similar to that of FIG. 4 except that the voltage applied to the node NV is a voltage V12CK obtained by a secondary regulator 510 of the amplifier type from the voltage V33. This makes the use of the charge pump 410 optional for starting the charge pump regulation loop. In the example shown, the optional circuit 410 is shown alone for clarity but it is for example connected in a similar way to FIG. 4.

In the example shown, a transistor PO, for example of PMOS type, couples the node NV to the V33 supply. This transistor is controlled by a differential amplifier whose inverting input (labelled-) receives a reference voltage Ref1V2_ech which is for example 1.2 V and/or sampled to reduce consumption. The non-inverting input (labelled +) is coupled, preferably connected, to the node NV. The voltage V12CK applied to NV is therefore regulated to tend toward the reference voltage Ref1V2_ech which is lower than V33, diminishing the residual ripples at the output of the charge pump circuit 202.

The embodiment of FIG. 5 allows a power supply voltage for the circuit BF11 to be chosen independently of the voltage V11. It nevertheless has a non-negligible static consumption.

Figure 6:
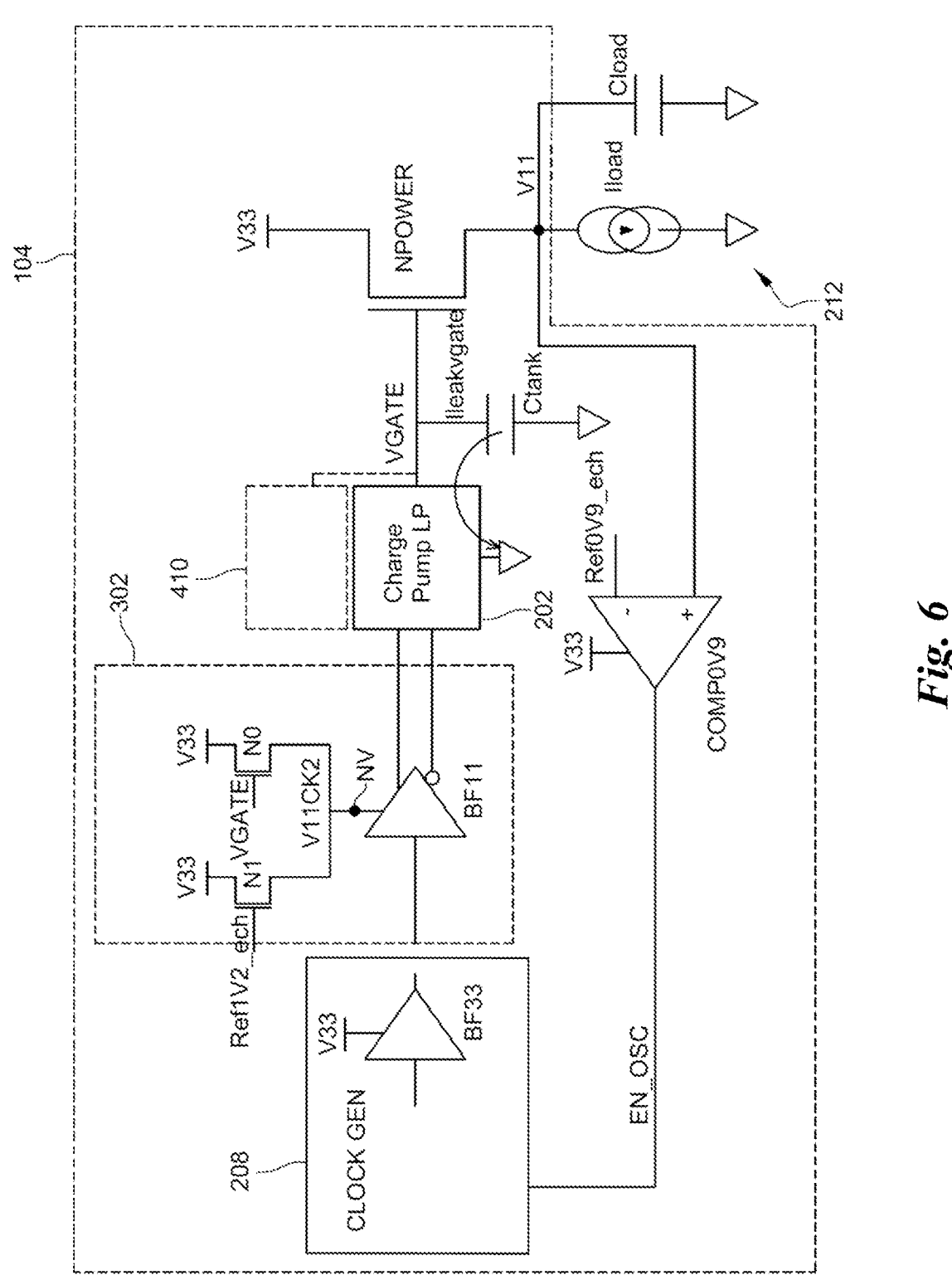
FIG. 6 shows schematically a regulator according to another embodiment.

FIG. 6 shows schematically a charge pump regulator according to yet another embodiment.

The regulator in FIG. 6 is similar to that of FIG. 5 but illustrates another embodiment of the voltage generating circuit (V11CK2) applied to the node NV.

In the example shown, the step-down or drop-down circuit 302 comprises two transistors N0 and N1, for example of the NMOS type, in parallel between the application node of the first supply voltage V33 and the node NV, with the sources of transistors N0 and N1 interconnected with the node NV.

One of the transistors, here NO, is controlled by the voltage VGATE of the output of the charge pump circuit 202. The other transistor, here N1, is controlled by a reference voltage Ref1V2_ech, of the type described in relation to FIG. 5.

The transistor N1 branch is a branch not only useful for starting but it also enables a minimum power supply V11CK2 to be maintained in the circuit BF11 in the case where the VGATE signal discharges faster than V11 (Ileavkvgate/Ctank>Iload/Cload).

The transistor NO branch, controlled by the VGATE level, increases the voltage V11CK2 if there is a large current consumed by the load 212 and ensures a faster response of the charge pump circuit to increase the VGATE level. This also improves operation at high temperatures when the consumption at the output V11 is high. This increases the VGATE voltage and that also increases the V11CK2 voltage. The result is a more powerful charge pump circuit. The proposed regulator thus adapts to variations in current Iload over a wide range. Moreover, the operation of the circuit 302 does not perturb the supply V11.

In the example shown, the circuit 410 is optionally implemented in a similar way to the examples of FIG. 4 or 5 to aid starting or to compensate large current draws. The circuit 410 is shown alone for clarity but it is for example connected in a similar way to FIG. 4.

Figure 7:
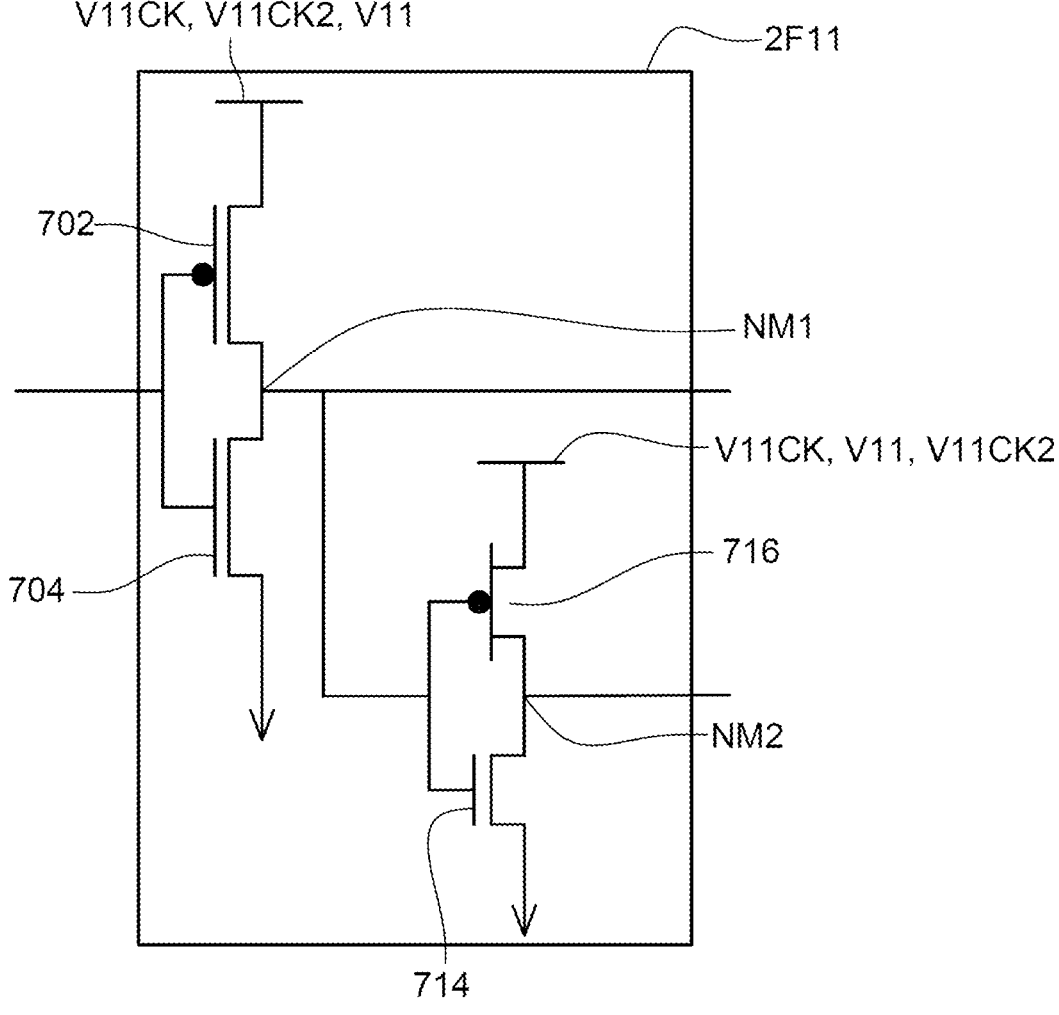
FIG. 7 shows schematically a regulator circuit according to one embodiment.

FIG. 7 shows schematically a regulator circuit according to one embodiment. More specifically, the example of FIG. 7 shows a voltage converter circuit in an example of one embodiment where the voltage converter circuit is the buffer circuit BF11 of FIGS. 4, 5 and 6.

In this example, the circuit BF11 comprises a first inverter stage with a PMOS transistor 702 in series with an NMOS transistor 704 between the supply node NV and the mass, with their respective gates interconnected and configured to be controlled by the clock signal from the clock signal generator 208. The midpoint (NM1) or node between transistor 702 and transistor 704 of the first stage supplies an inverse signal to the one applied to the input and having an excursion equal to the voltage applied to the node NV (V12CK, V11, V11CK2 according to the embodiment). The circuit BF11 comprises a second inverter stage with a PMOS transistor 716 in series with an NMOS transistor 714 between the node NV and the mass, with their respective gates interconnected to the midpoint NM1 of the first stage. The midpoint (NM2) or node between transistor 716 and transistor 714 in the second stage supplies the inverse of the signal on the node NM1 with the same excursion amplitude.

The nodes are coupled to the charge pump circuit 202, with node NM1 being the inverted output of the buffer circuit BF11 and the node NM2 its direct output.

Figure 8A:
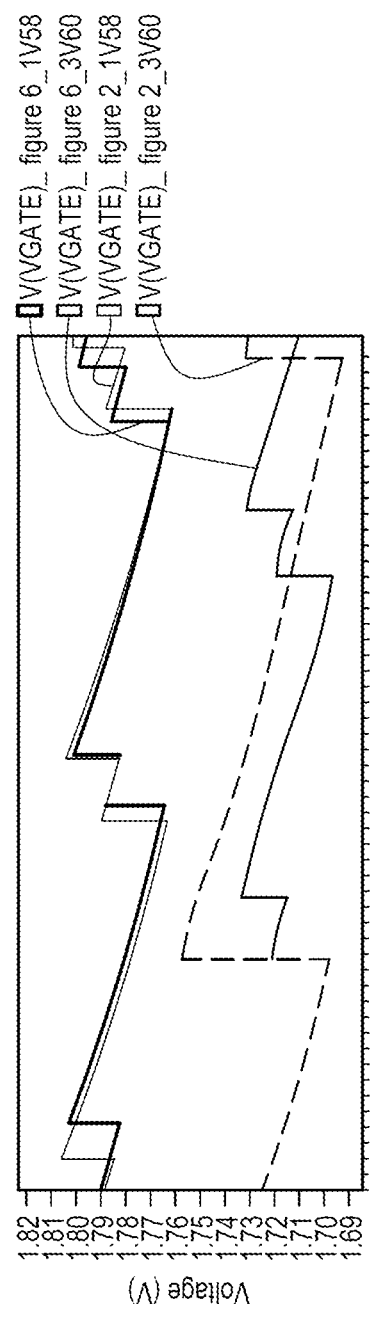
FIGS. 8A, 8B, and 8C is a set of graphs showing the time variations of signals from a regulator according to the example of FIG. 2 and according to the embodiment of FIG. 6.
Figure 8B:
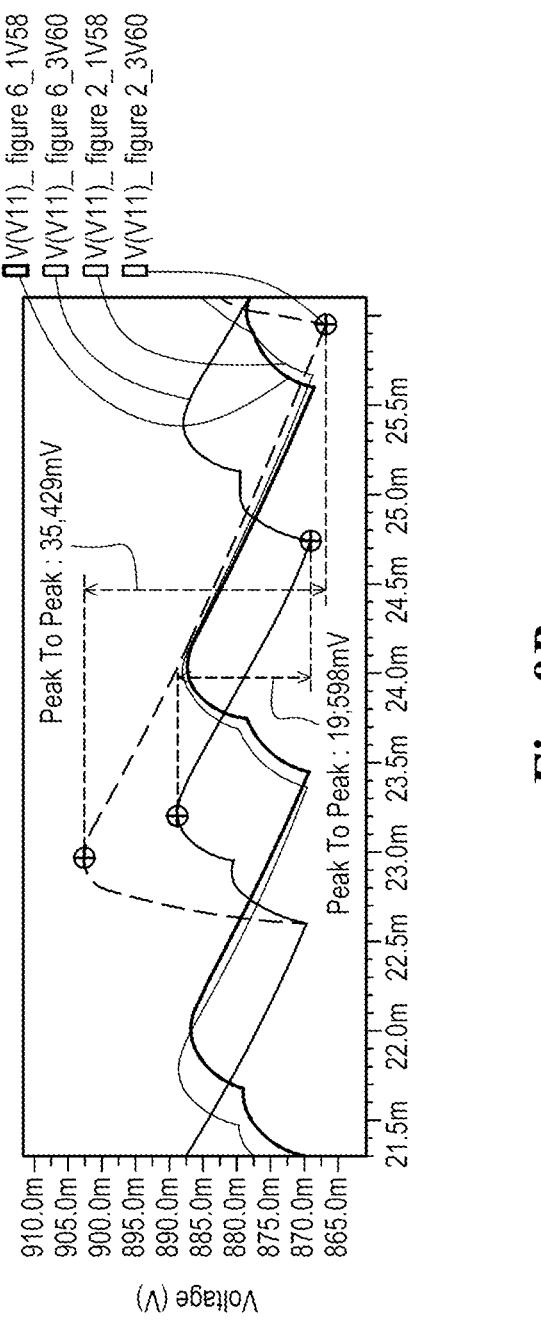
Figure 8C:
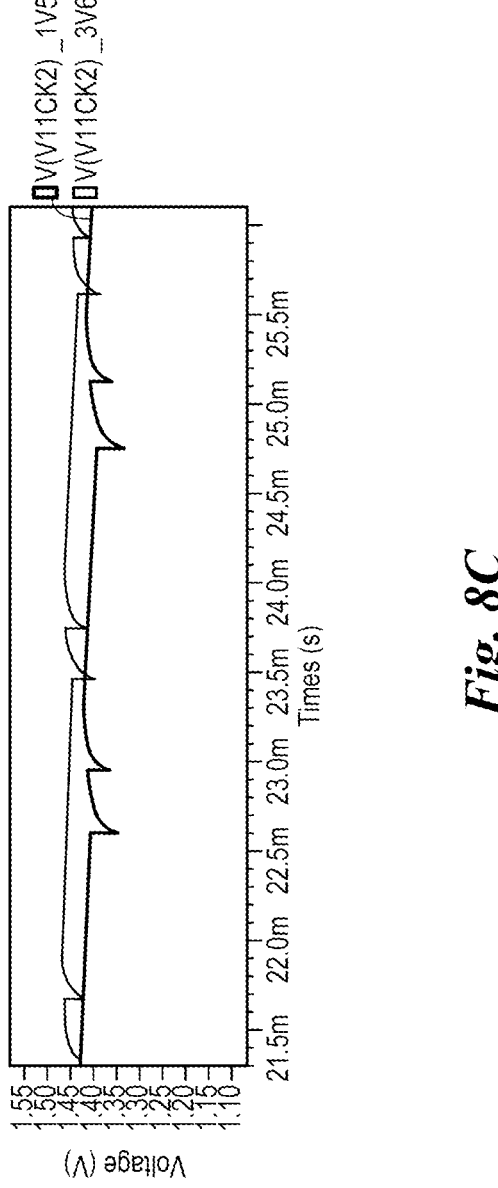

FIGS. 8A, 8B, and 8C is a set of graphs showing the time variations of signals from a charge pump regulator according to the example of FIG. 2 and according to the embodiment of FIG. 6.

More specifically, FIGS. 8A, 8B, and 8C is a set of graphs 8A, 8B and 8C, respectively, showing on graphs 8A and 8B the time variations of the signal voltage of a charge pump regulator according to the example of FIG. 2 and the embodiment of FIG. 6, and in graph 8C showing the voltage V11CK2 at the node NV of FIG. 6.

Graph 8A shows the residual oscillations of the VGATE signal in the example of FIG. 2 and FIG. 6 for a voltage V33 of 1.58 V (respectively (VGATE)_figure2_1V58 and (VGATE)_figure6_1V58)) and of 3.6 V (respectively (VGATE)_figure2_3V6 and (VGATE)_figure6_3V6).

Graph 8B shows the residual oscillations of the output voltage V11 in the example of FIG. 2 and FIG. 6 for a voltage V33 of 1.58 V (respectively (V11)_figure2_1V58 and (V11)_figure6_1V58) and a voltage of 3.6 V (respectively (V11)_figure2_3V6 and (V11)_figure6_3V6). Graph 8C shows the voltage V11CK2 in the example of FIG. 6 for a voltage V33 of 1.58 V and 3.6 V.

It can be seen that the peak to peak value of the residual oscillations of the output voltage V11 of the regulator has fallen by a half in the example of FIG. 6 compared with the example of figure, dropping from 38.429 mV to 19.598 mV. It can also be seen that the voltage V11CK2 varies very slightly whatever the level, 1.58 V ((V11CK2)_1V58)) or 3.6 V ((V11CK2)_3V60)) of the supply voltage V33.

Figure 9A:
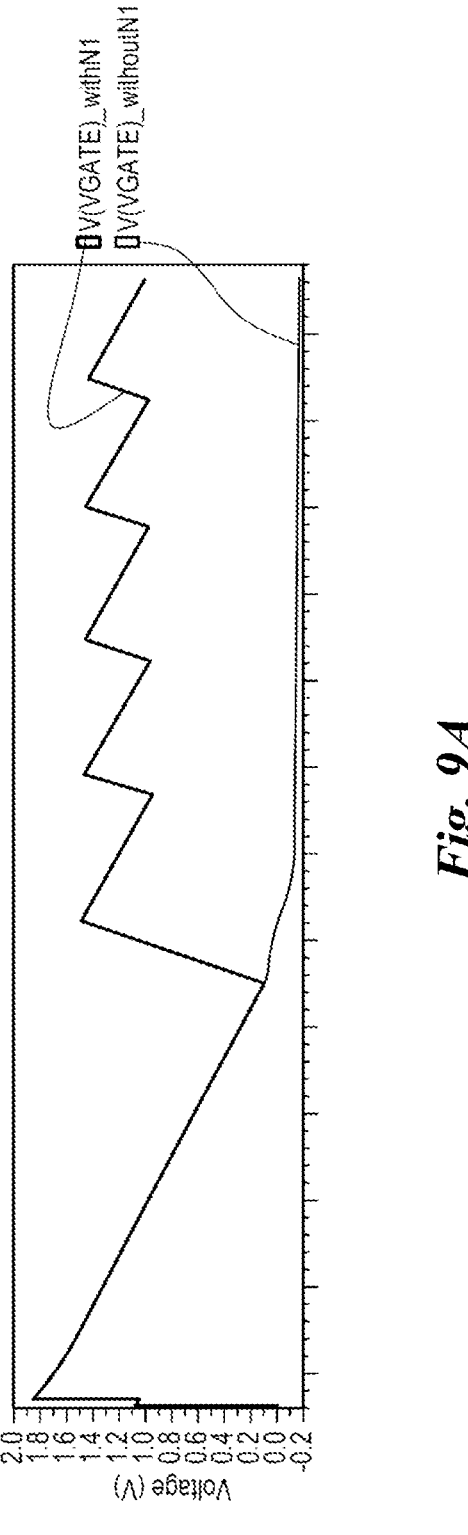
FIGS. 9A, 9B, and 9C is a set of graphs illustrating the operating of the embodiment of FIG. 6.
Figure 9B:
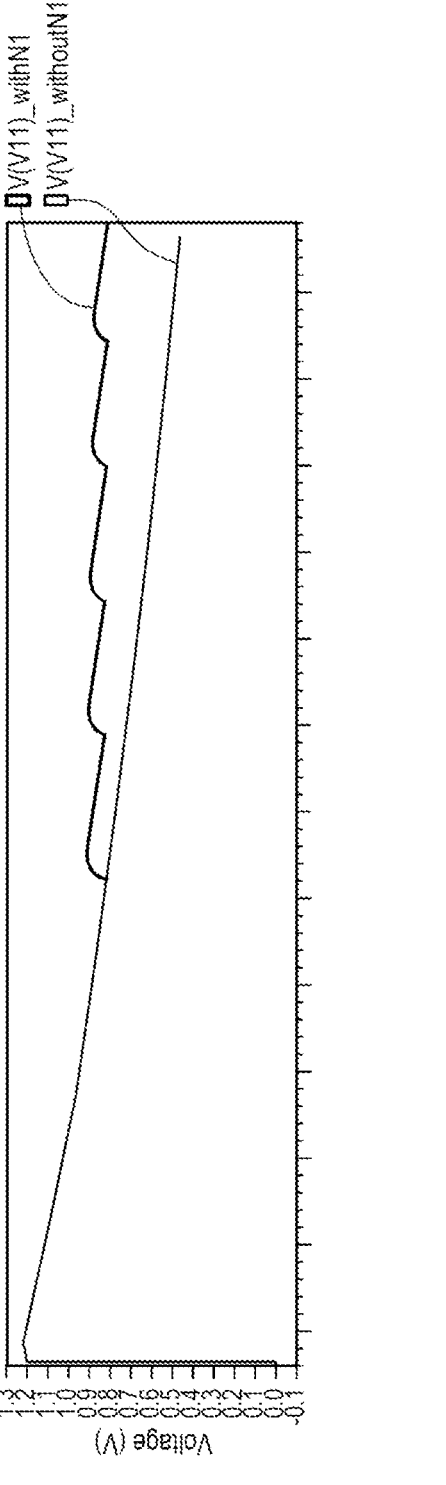
Figure 9C:
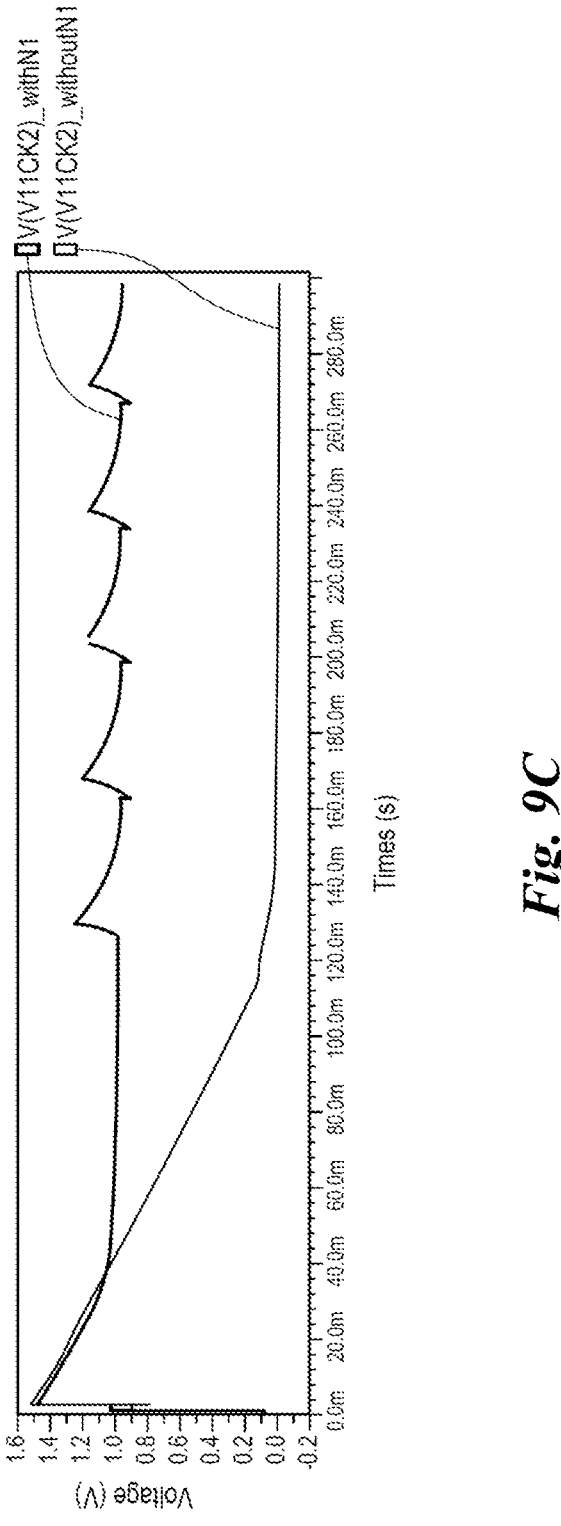

FIGS. 9A, 9B, and 9C is a set of graphs illustrating the operating of the embodiment of FIG. 6.

FIGS. 9A, 9B, and 9C is a set of graphs 9A, 9B and 9C, respectively, showing a comparison between the time variations of signals from a charge pump regulator according to the embodiment of FIG. 6 and the time variation of signals from a regulator of FIG. 6, from which a part of the regulator circuit is missing. More specifically, graphs 9A, 9B and 9C show the difference in behavior of the voltages respectively VGATE, V11 and V11CK2 in the case with transistor N1 (respectively (VGATE)_withN1), (V11)_withN1) and (V11CK2)_withN1)) or without N1 (respectively (VGATE)_withoutN1, (V11)_withoutN1, (V11CK2)_withoutN1.

It can be seen that in the case without N1 in the drop-down circuit 302, there can appear a loss of regulation (shown here over the time 120 to 140 ms). This case can occur for example when the load capacity Cload discharges more slowly than the capacity Ctank. Transistor N1 prevents this from occurring by maintaining the voltage level at the level at the time 40 ms.

Figure 10:
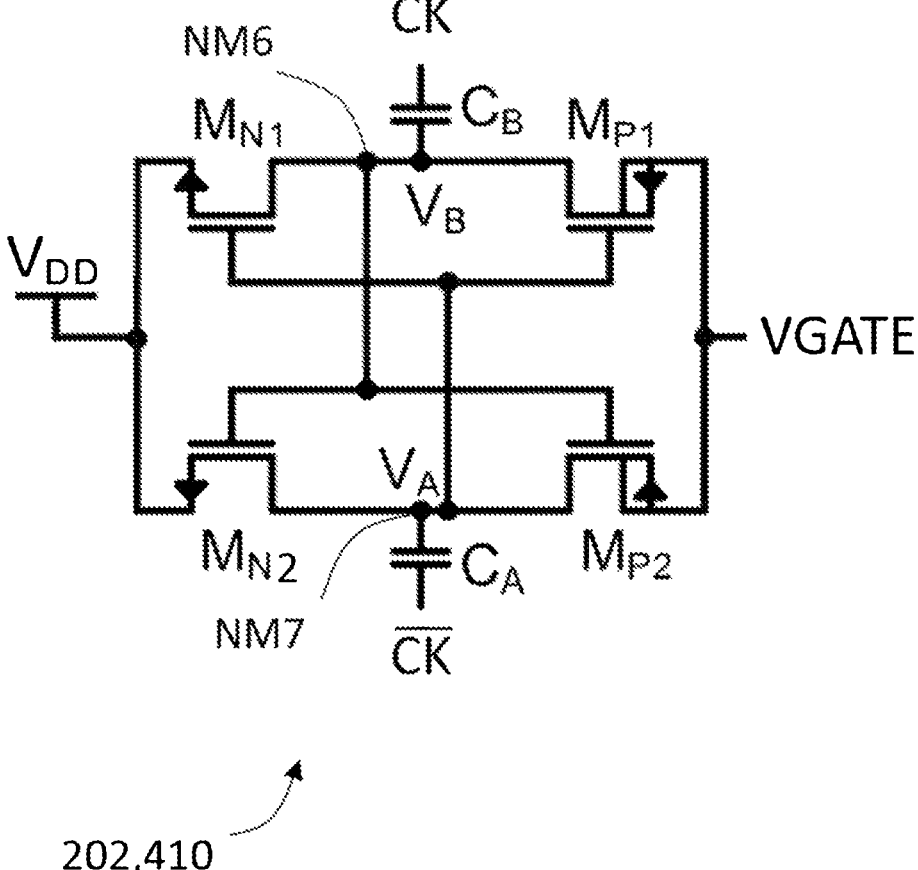
FIG. 10 shows schematically an embodiment of a circuit of the regulator of FIGS. 2 to 6.

FIG. 10 shows schematically an embodiment of a circuit of the regulator of FIGS. 2 to 6. More particularly, FIG. 10 represents an example of the charge pump circuits 202 or 410.

In the represented example, two invertors are connected in parallel between a VDD voltage rail and a node where VGATE is generated. Each of the two invertors have one NMOS transistor in series with a PMOS transistor. In one of the inverters, the PMOS transistor MP1 has a conduction node coupled to the VGATE output node and another conduction node coupled to a midpoint node NM6. The NMOS transistor MN1 has a conduction node coupled to the node NM6 and another conduction node coupled to the VDD voltage rail. In another of the inverters, the PMOS transistor MP2 has a conduction node coupled to the VGATE output node and another conduction node coupled to a midpoint node NM7. The NMOS transistor MN2 has a conduction node coupled to the node NM6 and another conduction node coupled to the VDD voltage rail.

In the represented example, a capacitance CB is coupled to the node NM6 and another capacitance CA is coupled to the node NM7. A clock signal CK is applied to the electrode of capacitance CB which is not coupled to node NM6 and the inversed clock signal CK is applied to the electrode of capacitance CA which is not coupled to node NM7.

In the represented example, the node NM7 is coupled to the controlling nodes of the transistors MP1 and MN1. The node NM6 is coupled to the controlling nodes of the transistors MP2 and MN2.

Various embodiments and variants have been described. Those skilled in the art will understand that certain features of these embodiments can be combined and other variants will readily occur to those skilled in the art. In particular, the second charge pump circuit 410 can be implemented optionally for each of the embodiments of FIGS. 3 to 6 in order for example to facilitate starting of the feedback loop 202.

Finally, the practical implementation of the embodiments and variants described herein is within the capabilities of those skilled in the art based on the functional description provided hereinabove. In particular, the practical implementation of a charge pump circuit is within the capabilities of those skilled in the art, the embodiments being compatible with all types of charge pump circuit, preferably capacitive. In addition, concerning the circuit BF11, those skilled in the art can implement a circuit powered by the voltages V11 or V12CK or V11CK2 enabling a clock signal to be obtained at its output, the difference in high and low levels of which is of the order respectively of V11 or V12CK or V11CK2 or inverted signals, the difference in whose high and low levels is of the order respectively of V11 or V12CK or V11CK2.

Regulator (104) may be summarized as including a first transistor (NPOWER) coupling an application node (NV33) of a first supply voltage (V33) to an output node (NV11) of the regulator to supply a first regulated voltage (V11); a feedback loop supplying a control signal to the first transistor (VGATE) and comprising: a first charge pump circuit (202); a control signal generator of the first charge pump circuit; and a step-down circuit (302) between the control signal generator and the charge pump circuit.

The control signal generator may include a clock signal generator (208) coupling the output node (NV11) and the step-down circuit (302).

The step-down circuit (302) may include a power supply node (NV) configured to receive a voltage (V11, V12CK, V11CK2) lower than the first supply voltage (V33).

The step-down circuit (302) may include a buffer circuit (BF11) configured to be controlled at its input by the clock signal.

The said buffer circuit (BF11) may include a first inverter stage with a PMOS transistor in series with an NMOS transistor, with their respective control nodes configured to be controlled by the clock signal, a midpoint (NM1) between the said PMOS transistor and the said NMOS transistor of the first stage being coupled to the charge pump circuit (202).

The said buffer circuit (BF11) may include a second inverter stage with a PMOS transistor in series with an NMOS transistor, their respective control nodes being connected to the said midpoint (NM1) of the first stage.

A midpoint (NM2) of the said PMOS transistor and the said NMOS transistor of the second stage may be coupled to the charge pump circuit.

A conduction node of the PMOS transistors of the first and/or second stages may be coupled to the said power supply node (NV) of the step-down circuit (302).

The output node (NV11) may be coupled to the said power supply node (NV) of the drop-down circuit (302).

The step-down circuit may include a second and third transistor (N0,N1), each having a conduction node coupled to the power supply node (NV) of the step-down circuit (302) and another conduction node coupled to the application node (NV33) of the first supply voltage.

A control node of the second transistor (N0) may be configured to receive the control signal (VGATE) of the first transistor (NPOWER).

A control node of the third transistor (N1) may be coupled to an application node of a reference voltage (Ref1V2_ech) lower than the first power supply voltage (V33).

The feedback loop (220) may include a comparator circuit (210) configured to compare the first voltage (V11) to a first reference voltage (Ref0V9_ech); the first charge pump circuit (202) being enabled or disabled in accordance with the said comparison.

The regulator may include a second charge pump circuit (410) configured to supply a control signal to the first transistor (NPOWER) when the first charge pump circuit (202) is disabled.

The regulator may be summarized as including a second comparator circuit (COMP0V85) configured to compare the first voltage (V11) with another reference voltage (Ref0V85_ech) lower than the first reference voltage (Ref0V9_ech); and a second control signal generator (230); the second charge pump circuit (410) being controlled by the second control signal generator in accordance with the comparison between the first voltage (V11) and the other reference voltage lower than the first reference voltage (Ref0V9_ech).

An integrated circuit may include a regulator according to any of the embodiments discussed above.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A regulator, comprising:

a first transistor coupling an application node of a first supply voltage to an output node of the regulator to supply a first regulated voltage;

a feedback loop supplying a first control signal to the first transistor, the feedback loop including:

a first charge pump circuit; and a first control signal generator for the first charge pump circuit; and a step-down circuit including a buffer circuit coupled between the first control signal generator and the first charge pump circuit, the buffer circuit coupled to a power supply node configured to receive a regulated voltage that is lower than the first supply voltage, the first control signal generator coupled between the output node and the step-down circuit; and a second charge pump circuit configured to supply a second control signal to the first transistor in case the first charge pump circuit is disabled.

2. The regulator according to claim 1, wherein the first control signal generator includes a clock signal generator.

3. The regulator according to claim 2, wherein the buffer circuit is configured to be controlled by a clock signal generated by the clock signal generator.

4. The regulator according to claim 3, wherein the buffer circuit includes a first inverter stage including a first PMOS transistor in series with first NMOS transistor, control nodes of the first PMOS transistor and the first NMOS transistor configured to be controlled by the clock signal, and a node between the first PMOS transistor and the first NMOS transistor of the first inverter stage is coupled to the first charge pump circuit.

5. The regulator according to claim 4, wherein the buffer circuit includes a second inverter stage including a second PMOS transistor in series with a second NMOS transistor, control nodes of the second PMOS transistor and the second NMOS transistor being coupled to the node between the first PMOS transistor and the first NMOS transistor of the first inverter stage.

6. The regulator according to claim 5, wherein a node between the second PMOS transistor and the second NMOS transistor of the second inverter stage is coupled to the first charge pump circuit.

7. The regulator according to claim 6, wherein a conduction node of the first PMOS transistor or the second PMOS transistor is coupled to the power supply node of the step-down circuit.

8. The regulator according to claim 1, wherein the step-down circuit includes a second and third transistor each of the second and third transistor having a first conduction node coupled to the power supply node of the step-down circuit and a second conduction node coupled to the application node of the first supply voltage.

9. The regulator according to claim 8, wherein a control node of the second transistor is configured to receive the control signal.

10. The regulator according to claim 8, wherein a control node of the third transistor is coupled to an application node of a reference voltage lower than the first supply voltage.

11. The regulator according to claim 1, wherein the feedback loop includes a comparator circuit configured to compare the first regulated voltage to a first reference voltage, and the first charge pump circuit is enabled or disabled in accordance with the comparison between the first regulated voltage and the first reference voltage.

12. The regulator according to claim 1, wherein the feedback loop includes a first comparator circuit configured to compare the first regulated voltage to a first reference voltage, the first charge pump circuit is enabled or disabled in accordance with the comparison between the first regulated voltage and the first reference voltage, and the regulator includes:

a second comparator circuit configured to compare the first regulated voltage with a second reference voltage lower than the first reference voltage; and a second control signal generator, the second charge pump circuit being controlled by the second control signal generator in accordance with the comparison between the first regulated voltage and the second reference voltage.

13. The regulator according to claim 1, wherein the step-down circuit includes:

a second transistor coupled between the power supply node and the application node; and an amplifier coupled to the second transistor and configured to control the second transistor based on a reference voltage.

14. The regulator according to claim 1, wherein the step-down circuit includes:

a second transistor coupled between the power supply node and the application node, the second transistor configured to be controlled by a reference voltage; and a third transistor coupled to the power supply node and the application node, the third transistor being configured to be controlled by the control signal.

15. An integrated circuit, comprising:

a regulator including:

a first transistor coupling an application node of a first supply voltage to an output node of the regulator to supply a first regulated voltage;

a feedback loop supplying a control signal to the first transistor, the feedback loop including:

a first charge pump circuit; and a first control signal generator for the first charge pump circuit; and a step-down circuit including a buffer circuit coupled between the first control signal generator and the first charge pump circuit, a second transistor, and third transistor, the buffer circuit coupled to a power supply node configured to receive a regulated voltage that is lower than the first supply voltage, the first control signal generator coupled between the output node and the step-down circuit, each of the second and third transistors having a first conduction node coupled to the power supply node and a second conduction node coupled to the application node of the first supply voltage, a control node of the second transistor is configured to receive the control signal; and circuitry coupled to the regulator.

16. The integrated circuit according to claim 15, wherein the first control signal generator includes a clock signal generator that is coupled between the output node and the step-down circuit.

17. The integrated circuit according to claim 15, wherein a control node of the third transistor is coupled to an application node of a reference voltage lower than the first supply voltage.

18. A device, comprising:

a first transistor configured to receive a supply voltage signal at an application node and supply a first regulated voltage signal using the supply voltage signal;

a clock signal generator configured to generate a clock signal;

a step-down circuit coupled to the clock signal generator, the step-down circuit including:

a buffer circuit configured to receive a second regulated voltage signal at a power supply node that is lower than the supply voltage signal and generate inverted signals using the second regulated voltage signal and the clock signal, the clock signal generator coupled between the first transistor and the step-down circuit;

a second transistor coupled between the power supply
node and the application node; and
a third transistor coupled between the power supply
node and the application node; and
a charge pump circuit coupled between the step-down
circuit and the first transistor, the buffer circuit coupled
between the charge pump circuit and the clock signal
generator, the charge pump circuit being controlled by
the inverted signals and configured to supply a control
signal to a gate of the first transistor,
the second transistor configured to be controlled by a
reference voltage, and the third transistor being con-
figured to be controlled by the control signal.

19. A regulator, comprising:
a first transistor coupling an application node of a first
supply voltage to an output node of the regulator to
supply a first regulated voltage;
a feedback loop supplying a control signal to the first
transistor, the feedback loop including:
a first charge pump circuit;
a first control signal generator for the first charge pump
circuit; and

14 a first comparator circuit configured to compare the first
regulated voltage to a first reference voltage, the first
charge pump circuit is enabled or disabled in accor-
dance with the comparison between the first regu-
lated voltage and the first reference voltage;
a step-down circuit coupled between the first control
signal generator and the first charge pump circuit;
a second charge pump circuit configured to supply the
control signal to the first transistor in case the first
charge pump circuit is disabled;
a second comparator circuit configured to compare the
first regulated voltage with a second reference voltage
lower than the first reference voltage; and
a second control signal generator, the second charge pump
circuit being controlled by the second control signal
generator in accordance with the comparison between
the first regulated voltage and the second reference
voltage.

20. The regulator according to claim 19, wherein the
step-down circuit includes a power supply node, and the
output node is coupled to the power supply node of the
step-down circuit.

* * * * *